Nov. 23, 1954  G. BACHER  2,694,827
CONNECTOR FOR WINDSHIELD WIPER BLADES
Filed June 22, 1953

INVENTOR
Gottlob Bacher
by
Stevens, Davis, Miller & Mosher
his attorneys

United States Patent Office 2,694,827
Patented Nov. 23, 1954

2,694,827

CONNECTOR FOR WINDSHIELD WIPER BLADES

Gottlob Bacher, Stuttgart-Weil im Dorf, Germany, assignor to Robert Bosch G. m. b. H., Stuttgart, Germany Application June 22, 1953, Serial No. 363,013

Claims priority, application Germany June 28, 1952

13 Claims. (Cl. 15—250)

This invention relates to a screen wiper, more particularly for mechanically propelled vehicles, having a wiper arm or lever bent over at one end to form a hook which is hinged to the wiper blade support and is held against automatic detachment by a holding spring which may be detached manually.

With the previously known screen wipers of the said type the coupling parts between wiper arm and wiper blade have only a comparatively loose connection. Therefore, it may happen during operation that these connections become so loose that the wiper blade can no longer fulfil its task effectively.

Accordingly to this invention the disadvantages mentioned above may be eliminated and a coupling device produced by simple means, which is durable even when being operated under considerable stress, in that the coupling part which is to be connected to the hook-shaped end of the wiper arm is hinged to the wiper blade support and consists of a two-armed spring stirrup, the arms of which are pressed towards one another resiliently by the hook-shaped end of the wiper arm in such a manner that a catch connection is produced between the two parts.

Figure 1:
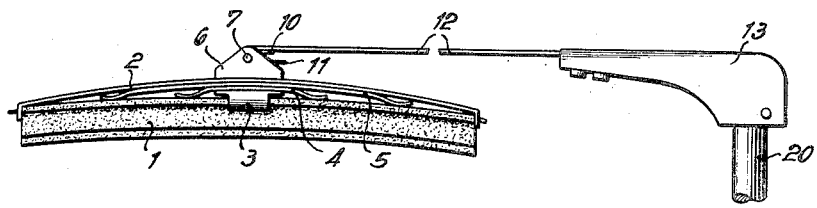
Figure 2:
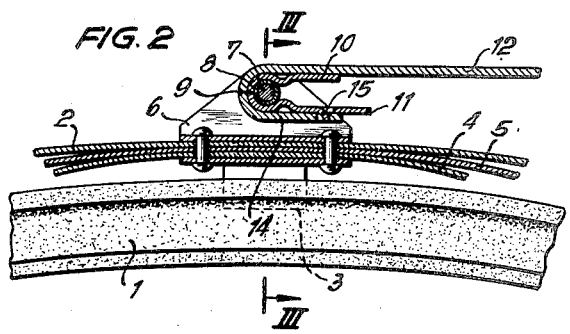
Figure 3:
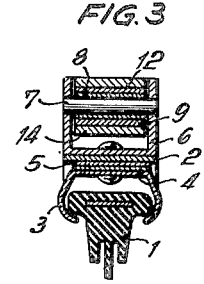
Figure 4:
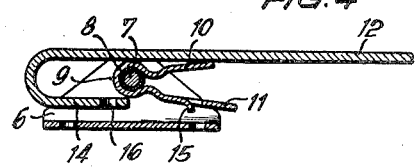
Figure 5:
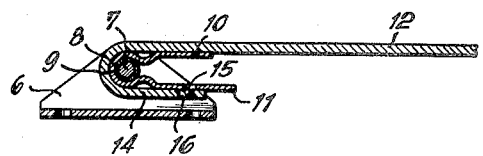
Figure 6:
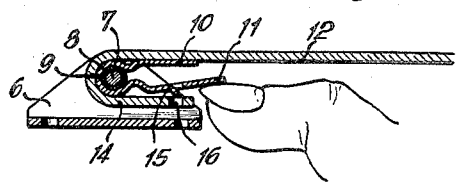

The invention is further described with reference to the accompanying drawings which illustrate one embodiment of the invention by way of example only and in which:

Fig. 1 is a side elevation of a wiper blade with wiper arm,

Fig. 2 a part sectional detail of Fig. 1 drawn to a larger scale and showing the parts of the coupling between wiper arm and wiper blade, Fig. 3 a cross section through the coupling taken on line III—III of Fig. 2, Fig. 4 a longitudinal section through the coupling prior to assembly of the parts, Fig. 5 a similar section of the coupling parts when assembled, and Fig. 6 a section similar to Fig. 5 but showing how the coupling parts can be easily disengaged manually prior to detachment of the coupling parts.

Referring to the drawings, the wiper blade 1, which is T-shaped in cross section, is suspended on a wiper blade support consisting of a resilient ribbon-like strip 2. Between the wiper blade support 2 and a supporting stirrup 3 which encloses the flange of the T-shaped wiper blade, two leaf springs 4, 5 are disposed, said springs being secured to the wiper blade support 2 with their free ends pressing resilient against the flange of the wiper blade 1.

On the wiper blade support 2 is mounted a U-shaped bearing block or bracket 6 in the upwardly directed shanks whereof an axle 7, transversely crossing the wiper blade, is rotatably mounted. Secured on the axle 7 is a bushing 8 which is received in the closed end part 9 of a two-armed spring stirrup. The two arms of this stirrup are indicated at 10 and 11.

The wiper arm, which consists of a ribbon-like strip 12, is secured at one end in a holder 13 which is coupled to the driving shaft 20 which imparts the directional movements to the arm 12 and its other end is bent over at 14 to form a hook. When connecting the wiper arm 12 to the wiper blade support 2, the spring stirrup 9, 10, 11 hinged to the wiper blade support 2 is inserted with its closed end part 9 foremost into the hooked-shaped end of the wiper arm 12. Thus, the arms 10, 11 of the spring stirrup are pressed towards one another accordingly whilst a nose-like projection 15, pressed out of the arm 11, finally snaps into a corresponding hole 16 provided in the bent over end 14 of the wiper arm with a locking effect. The arm 11 of the spring stirrup projects beyond the bent over end 14 of the wiper arm after the parts are fitted together.

When detaching the coupling parts, the arm 11 of the spring stirrup is raised manually, as shown in Fig. 6, to bring the nose-like projection 15 out of engagement with the hole 16. Thereupon, the wiper arm 12 may be immediately slid to the position shown in Fig. 4 and thereby becomes separated from the wiper blade support 2.

I claim:

1. In a screen wiper, more particularly for mechanically propelled vehicles, a wiper blade support, a wiper blade carried by said support, a two-armed spring stirrup, means hingedly connecting the spring stirrup to said support with the two arms of the stirrup extending from the hinged connection and confronting one another, an arm for actuating said wiper blade support with wiper blade and having one end bent over to form a hook which is adapted to slide over the spring stirrup and press the arms thereof towards one another resiliently, means being provided to detachably hold the spring stirrup in the hook-shaped portion of the wiper arm to form a detachable catch connection.

2. A screen wiper according to claim 1 in which the arm of the spring stirrup which faces the bent over portion of the hook-shaped end of the wiper arm extends freely beyond said bent over portion for use in manually operating said spring stirrup arm to effect disengagement of said catch connection.

3. A screen wiper according to claim 2 in which the bent over end portion of the wiper arm and the arm of the spring stirrup which faces it are provided with coacting means for producing said catch connection.

4. A screen wiper according to claim 3 in which the bent over end portion of the wiper arm has a depression and the arm of the spring stirrup facing it has a raised portion which is adapted to snap into the depression when connecting the coupling parts.

5. In a screen wiper, more particularly for mechanically propelled vehicles, a wiper blade support, a wiper blade carried by said support, a two-armed spring stirrup, means hingedly connecting the spring stirrup to said support with the two arms of the stirrup extending from the hinged connection and confronting one another, an arm for actuating said wiper blade support with wiper blade and having one end bent over to form a hook which is adapted to slide over the spring stirrup and press the arms thereof towards one another resiliently, means being provided to detachably hold the spring stirrup in the hook-shaped portion of the wiper arm to form a detachable catch connection and the spring stirrup having its arm which faces the bent over portion of the hook-shaped end of the actuating arm extending freely beyond the end of said bent over portion for use in effecting disengagement of said catch connection.

6. In a screen wiper, more particularly for mechanically propelled vehicles, a wiper blade support, a wiper blade carried by said support, a two-armed spring stirrup, means hingedly connecting the closed end of the stirrup to said support with the two arms of the stirrup extending from the hinged connection and confronting one another, an arm for actuating said wiper blade support with wiper blade and having one end bent over to form a hook which is adapted to slide over the spring stirrup and press the arms thereof towards one another resiliently, and coacting means between the bent over end of the actuating arm and the adjacent arm of the spring stirrup for producing a "snap action" catch connection between the wiper blade support and its actuating arm.

7. A screen wiper according to claim 6 in which the closed end of the spring stirrup is rounded and firmly encloses a bushing which is rotatably mounted on the wiper blade support.

8. A screen wiper according to claim 7 in which the bushing is rotatably mounted on a fixed axis.

9. A screen wiper according to claim 7 in which the bushing has a pin firmly inserted therein, the ends of the pin projecting out of the bushing being rotatably mounted on the wiper blade support.

10. In a screen wiper, more particularly for mechanically propelled vehicles, a wiper blade support, a wiper blade carried by said support, a two-armed spring stirrup, means hingedly connecting the closed end of the stirrup to said support with the two arms of the stirrup extending from the hinged connection and confronting one another, an arm for actuating said wiper blade support with wiper blade and having one end bent over to form a hook which is adapted to slide over the spring stirrup and press the arms thereof towards one another resiliently, coacting means between the bent over end of the actuating arm and the adjacent arm of the spring stirrup for producing a "snap action" catch connection between the wiper blade support and its actuating arm, and the spring stirrup having its arm which faces the bent over portion of the hook-shaped end of the actuating arm extending freely beyond the end of said bent over portion for use in effecting disengagement of said catch connection.

11. In a screen wiper, more particularly for mechanically propelled vehicles, a wiper blade support, a wiper blade carried by said support, a bracket on said support, spaced lugs extending from said bracket, a pin rotatably mounted in said lugs, a bushing firmly mounted on said pin between said lugs, a two-armed spring stirrup having its closed end rounded and firmly enclosing said bushing with its two arms extending therefrom and confronting one another, an arm for actuating said wiper blade support with wiper blade and having one end bent over to form a hook which is adapted to slide over the spring stirrup and press the arms thereof towards one another resiliently, and coacting means between the bent over end of the actuating arm and the adjacent arm of the spring stirrup for producing a "snap action" catch connection between the wiper blade support and its actuating arm.

12. In a screen wiper, more particularly for mechanically propelled vehicles, a wiper blade support, a wiper blade carried by said support, a bracket on said support, a pin rotatably mounted in spaced lugs of said bracket, a bushing secured to said pin, a two-armed spring stirrup having a rounded closed end firmly enclosing said bushing with its two arms extending therefrom and confronting one another, an arm for actuating said wiper blade support with wiper blade and having one end bent over to form a hook which is adapted to slide over the spring stirrup and press the arms thereof towards one another resiliently and quickly engage the same to provide a readily manually detachable connection between the wiper blade support and its actuating arm, the distance between the arms of the spring stirrup when released by the hooked end of the wiper arm being greater than the distance between the bent over end of the wiper arm and the portion of the arm facing said bent over end.

13. In a screen wiper, more particularly for mechanically propelled vehicles, a wiper blade support, a wiper blade carried by said support, a two-armed spring stirrup, means hingedly connecting the spring stirrup to said support with the two arms of the stirrup extending from the hinged connection and confronting one another, an arm for actuating said wiper blade support with wiper blade and having one end bent over to form a hook which is adapted to slide over the spring stirrup and press the arms thereof towards one another resiliently and frictionally engage the same to provide a readily manually detachable connection between the wiper blade support and its actuating arm.

References Cited in the file of this patent

UNITED STATES PATENTS

| Number | Name | Date |
|---|---|---|
| 1,719,006 | Fogland | July 2, 1929 |
| 2,087,686 | Horton | July 20, 1937 |
| 2,548,090 | Anderson | Apr. 10, 1951 |
| 2,596,063 | Anderson | May 6, 1952 |
| 2,659,097 | Morton | Nov. 17, 1953 |